United States Patent
Grant

(10) Patent No.: US 11,170,670 B2
(45) Date of Patent: Nov. 9, 2021

(54) LIVE CONFIGURABLE DEVICE AND PACKAGE LABELING

(71) Applicant: Covidien LP, Mansfield, MA (US)

(72) Inventor: Matthew Tyson Grant, San Marcos, CA (US)

(73) Assignee: Covidien LP, Mansfield, MA (US)

( * ) Notice: Subject to any disclaimer, the term of this patent is extended or adjusted under 35 U.S.C. 154(b) by 0 days.

(21) Appl. No.: 16/779,090

(22) Filed: Jan. 31, 2020

(65) Prior Publication Data

US 2020/0251022 A1 Aug. 6, 2020

Related U.S. Application Data

(60) Provisional application No. 62/800,882, filed on Feb. 4, 2019.

(51) Int. Cl.
| | |
|---|---|
| *G09F 3/04* | (2006.01) |
| *G09F 3/20* | (2006.01) |
| *G06K 19/07* | (2006.01) |
| *G06F 3/0481* | (2013.01) |
| *G06F 3/14* | (2006.01) |

(52) U.S. Cl.
CPC .............. *G09F 3/04* (2013.01); *G06F 3/0481* (2013.01); *G06F 3/1431* (2013.01); *G06K 19/0717* (2013.01); *G09F 3/208* (2013.01)

(58) Field of Classification Search
CPC .................................. G09F 3/04; G06K 19/07
See application file for complete search history.

(56) References Cited

U.S. PATENT DOCUMENTS

| | | | | |
|---|---|---|---|---|
| 8,313,025 | B2* | 11/2012 | Saxena | .................... G09F 3/204 |
| | | | | 235/383 |
| 8,800,187 | B2* | 8/2014 | Peterson | ................. G09F 7/002 |
| | | | | 40/611.01 |
| 9,679,310 | B1* | 6/2017 | Saltzstein | ............... G06F 3/043 |

OTHER PUBLICATIONS

7200 Series Ventilator, Options, and Accessories: Operator's Manual. Nellcor Puritan Bennett, Part No. 22300 A, Sep. 1990, pp. 1-196.
7200 Ventilatory System: Addendum/Errata. Nellcor Puritan Bennett, Part No. 4-023576-00, Rev. A, Apr. 1998, pp. 1-32.
800 Operator's and Technical Reference Manual. Series Ventilator System, Nellcor Puritan Bennett, Part No. 4-070088-00, Rev. L, Aug. 2010, pp. 1-476.
840 Operator's and Technical Reference Manual. Ventilator System, Nellcor Puritan Bennett, Part No. 4-075609-00, Rev. G, Oct. 2006, pp. 1-424.
Puritan Bennett 980 Series Ventilator Operator's Manual, Covidien, Jan. 29, 2014, Part No. 10077893 A Jan. 2014, 506 pages.

* cited by examiner

*Primary Examiner* — K. Wong

(57) ABSTRACT

A method for configuring an electronic label is provided. The method may include receiving, at a communication interface associated with an electronic label, at least one configuration setting corresponding to one or more predefined outputs stored in memory of the electronic label, based on the received at least one configuration setting, selecting a predefined output from a plurality of predefined outputs to be displayed at a display of the electronic label, and causing the selected predefined output to be displayed at the display of the electronic label.

20 Claims, 6 Drawing Sheets

LIVE CONFIGURABLE DEVICE AND PACKAGE LABELING

CROSS-REFERENCE TO RELATED APPLICATIONS

This application claims the benefit of U.S. Provisional Application No. 62/800,882, filed Feb. 4, 2019 and titled "LIVE CONFIGURABLE DEVICE AND PACKAGE LABELING," the disclosure of which is hereby incorporated herein by reference.

BACKGROUND

Exporting goods from manufacturing facilities, distribution centers, and certification centers to vendors, retailers, and consumers located in various destination countries generally requires obtaining an export customs clearance in a country of origin, and then when shipped, processing such shipped goods at customs and inspection centers located at a destination country's port of entry. That is, export customs clearance is generally required by authorities in the country of origin for registration of goods leaving the country. The export customs clearance process involves validating the goods against the booking details and then issuing documentation indicating that the goods are ready to ship. Authorities in the destination country then require import customs clearance for all goods moving into the country. Similar to the export customs clearance process, the import customs clearance is the process of preparing and submitting the declaration and the required documentation to customs authorities at the destination country. When such goods, such as medical devices, are regulated by country of origin and/or destination country, such regulations may require one or more certifications to ensure product quality, and changes to such goods generally cannot be made without undergoing a recertification process. That is, a device that is manufactured, assembled, and then certified cannot undergo changes in the field and be sold or transferred to another party unless the device is recertified again. Thus, the device must be shipped to a certification facility after the change has been made, imparting additional expense and delaying delivery of such device to an end user.

Similarly, in instances where inventory of a particular device has accumulated in one country, but a demand for the particular device is greater in another country, most regulated goods cannot simply be shipped from a country of low demand to a country where demand for the good is higher. This is because the particular goods may have been specifically assembled to comply with certain requirements and/or regulations of the destination country and identified as such. For example, text labels affixed to devices may be in a language specific to the destination country and may be assigned a particular stock-keeping unit (SKU). Thus, in order to ship devices having a first SKU out of a particular country where demand may be low to another country where demand may be high, the text labels on the devices would need to be changed to match the language of the new destination country. However, in many instances, such changes cannot be performed without the device being subjected to the recertification process to comply with industry specific regulations for the new destination country. Further, if such a change were to occur in the field, the product description would no longer match the information associated with the correct SKU. Thus, in instances where the device may be subject to import and export customs clearances, additional time and expense may be incurred, as the device no longer matches the originating SKU. Accordingly, many manufacturers are forced to create similar products differing only by translated languages on labels affixed to the products, where each product having a different language is assigned a different SKU. However, as previously described, having multiple SKUs may cause inventory issues when demand for one SKU (i.e., in one country) is greater than a demand for another SKU (i.e., in a different country).

Accordingly, in order to minimize excess inventory when importing and exporting goods in regulated industries, a reduced number of SKUs for a same device is desirable.

SUMMARY

In general, methods and systems are provided such that products may be reconfigured based on compliance with certain requirements and/or regulations without requiring product recertification once configured. The methods and systems describe herein leverage electronic labels to change displayed information, where the information displayed is one of a plurality of predefined outputs that may be stored in memory at the time of certification and/or verification. Accordingly, the predefined output may be changed based on language preferences, unit preferences, or the like and may be easily changed as the product is preparing for transport, while the product is being transport, and/or when the product is received.

In accordance with at least one example of the present disclosure, a method for configuring an electronic label is provided. The method may include receiving, at a communication interface associated with an electronic label, at least one configuration setting corresponding to one or more predefined outputs stored in memory of the electronic label and based on the received at least one configuration setting, selecting a predefined output from a plurality of predefined outputs to be displayed at a display of the electronic label. Further, the method may cause the selected predefined output to be displayed at the display of the electronic label.

In accordance with aspects of the above example, each predefined output may correspond to a translation of at least one of a same word in a different language, a combination of words in a different language, one or more numbers in a different language, and/or one or more symbols in a different language. In some aspects, the at least one configuration may correspond to a regional configuration setting. Moreover, the method may include maintaining a durable image of the predefined output after removing power supplied to the display of the electronic label.

In accordance with at least one example of the present disclosure, a method for configuring a plurality of devices for compliance with one or more certification standards is provided. The method may include configuring the plurality of devices according to a certification process, wherein the configuration includes at least first and second configuration settings associated with a device attribute, the first and second configuration settings maintaining compliance with the certification process, and reconfiguring the second configuration settings associated with the device attribute to match the first configuration settings associated with the device attribute while remaining in compliance with the certification process in the absence of recertification, wherein each device of the plurality of devices is associated with a same device identifier.

In accordance with aspects of the above example, the method may include configuring the plurality of devices in accordance with the first configuration setting by receiving, at a communication interface associated with an electronic label of the device, the first configuration setting corresponding to one or more predefined outputs stored in memory associated with the electronic label, based on the received first configuration setting, selecting a predefined output from a plurality of predefined outputs to be displayed at a display of the electronic label, and causing the selected predefined output to be displayed at the display of the electronic label. Such configuration may be performed for each device of the plurality of devices. Moreover, the method may include maintaining a durable image of the selected predefined output after removing power supplied to the display of the electronic label.

In accordance with at least one example of the present disclosure, an electronic label is provided. The electronic label may include a display, a communication interface, and memory. The electronic label may be configured to receive at least one configuration setting corresponding to one or more predefined outputs stored in the memory, based on the received at least one configuration setting, select a predefined output from a plurality of predefined outputs to be displayed at the display, and cause the selected predefined output to be displayed at the display.

In accordance with aspects of the above example, the electronic label may be attached to device, such as a medical device. Alternatively, or in addition, the electronic label may be integrated into a device, such as a medical device. Moreover, the electronic label may be configured to maintain a durable image of the predefined output after removing power supplied to the display of the electronic label.

In accordance with at least one example of the present disclosure, a method for configuring a plurality of devices for compliance with one or more certification standards is provided. The method may include configuring a first plurality of devices in accordance with a first configuration setting and certifying the first plurality of devices in accordance with a certification process. The method may further include configuring a second plurality of devices in accordance with a second configuration setting, and certifying the second plurality of devices in accordance with the certification process. Further, the method may include determining that a need for the first plurality of devices configured in accordance with the first configuration setting is greater than a supply of the first plurality of devices configured in accordance with the first configuration setting, and reconfiguring one or more of the second plurality of devices in accordance with the first configuration, wherein upon reconfiguration, the one or more of the reconfigured second plurality of devices remain in compliance with the certification process in the absence of recertification.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
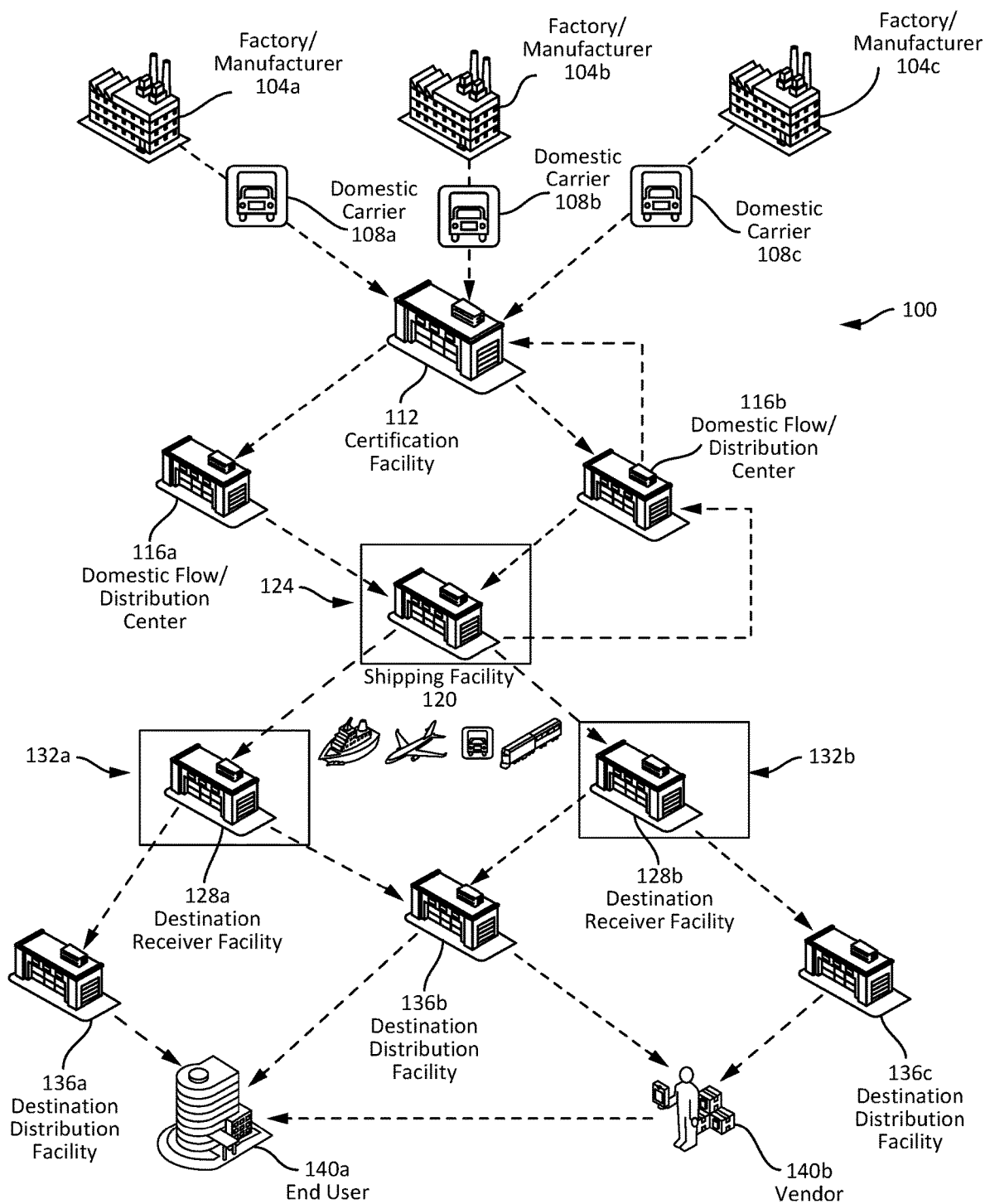
FIG. 1 illustrates a schematic diagram of an example distribution chain for a manufacturer that distributes products throughout various countries.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes distribution processing systems and methods which rely on electronic labels to simplify compliance with regulations and import and export customs clearance processes, as well as inventory management for exported goods. That is, many distribution chains involving one or more products that require compliance with regulations and import/export customs clearance processes generally utilize a country-specific SKU identifier. For example, a product destined for the United States may have a different SKU identifier than the same product destined for Germany. That is, the product destined for Germany may operate and function in the same manner as the product destined for the United States; however, translated text on fixed labels applied to the exterior of the product may be the sole differentiating factor between the product meant for Germany and the product meant for the United States. In addition, when shipping such products to Germany and/or the United States for example, the product having the SKU corresponding to the English text must be sent to the United States and so designated throughout the customs clearance process. Likewise, the product having the SKU corresponding to the German text must be sent to Germany and so designated throughout the customs clearance process. That is, regulations generally require that if a fixed label of a product is modified, then the product itself is modified and recertification is required. Moreover, in the case of affixing a new label in a different language, a new SKU would also be required as the product would no longer match the previously assigned SKU corresponding to the previous label.

In some instances, additional regulatory certification is required. For example, some regulated products must undergo a certification process and ship from ISO 13485 facilities that ensure medical device quality prior to being processed through customs. Accordingly, once the product has been shipped, a verification process may occur at the destination country's port of entry to ensure the product has been certified and matches the pre-specified SKU in compliance with applicable governing regulations. Moreover, and as previously discussed, inventory management becomes complicated and may result in additional expenses and loss of time when reshipping such products to meet demand.

FIG. 1 illustrates a schematic diagram of an example distribution chain for a manufacturer that distributes products throughout various countries. The diagram 100 illustrates the flow of products from one or more locations of the manufacturer 104a/104b/104c to the end user 140a and/or vendor 140b. An example of a product manufactured by the manufacture and provided to the end user 140a and/or vendor 140b may include a medical device that is regulated by one or more governing bodies and/or one or more standards, such as ISO standard 13485. The product may move through various stages to arrive at the end user 140a and/or vendor 140b. In this example, the nodes include three manufacturing locations 104a/104b/104c, a certification facility 112 (e.g., an ISO 13485 facility), two flow/distribution centers 116a/116b, a shipping facility 120, two destination receiver facilities 128a/128b, three destination distribution facilities 136a/136b/136c, a vendor 140b and an end user 140a. In practice, the distribution chain could include many more or less stages. In some embodiments, there are more or fewer carriers, including both foreign and domestic inland carriers, overseas carriers, and/or air carriers. In additional or alternative embodiments, there may be more certification facilities 112, shipping facilities 120, and destination receiver facilities 128a/128b located within different countries. Moreover, the shipping facility 120 may function as an export customs clearance processing facility 124 while the destination receiver facility 128a/128b may also function as an import customs clearance processing facility 132a/132b. Arrows in the diagram indicate movement of products.

In accordance with some examples, a product may be manufactured at the factory/manufacturer 104a/104b/104c and may be transported to a certification facility 112 via one or more domestic carriers 108a/108b/108c. The product may undergo certification review and/or additional verification procedures to verify that the product complies with one or more regulations from one or more governing bodies. The verification process may also include verifying that an external configuration of the product complies with requirements, such as language requirements, of the intended destination and that the appropriate SKU identifier has been assigned to the product. For example, one or more external labels (such as warning labels, directive labels, component labels, etc.) may need to be affixed to the exterior housing of a regulated product. For compliance, such labels must be posted in one or more designated languages of a destination country and, once such labels are affixed to the product and verified, neither the product nor the labeling can be altered. An appropriate SKU is assigned to the certified product and submitted to the export and import authorities prior to shipping. Upon certification at an ISO 13485 facility, the product may then be sent to the flow/distribution center 116a/116b where such products may be staged for shipment to the shipping facility 120 and destination receiver facility 128a. The shipping facility 120, also known as a consolidator, and the destination receiver facility 128a/128b, also known as a deconsolidator, may further include, or otherwise be associated with, customs processing facilities 124 and 132a/132b. Alternatively, or in addition, the customs processing facilities 124 and 132a/132b may be located at a port of entry/exit for the origination/receiving countries. At the customs facilities 124 and 132a/132b, the product may be verified to match a specific SKU and, in some instances, the product may be inspected to further verify that the product being shipped and received complies with country specific regulations. From the destination receiver facility 128a/128b/128c, the product may be transported to the vendor 140b and/or the end user 140a.

In instances where a surplus of the product exists in one country, the surplus product cannot simply be shipped to another country that has an insufficient supply of the product. This is because the labeling associated with the surplus product may not comply with labeling requirements of the other country. For example, the labeling associated with the surplus product may be in a first language while the labeling requirements of the other country may require that the labeling be in a second different language. Because the labeling must be altered, the surplus product must be returned to the ISO 13485 certification facility such that new labels can be applied and a new appropriate SKU can be assigned to the surplus product based on an intended destination of the product. The product, now having the appropriate labeling and SKU, may be shipped from the ISO 13485 certification facility to the flow/distribution center 116a and transported to the end user 140a and/or vendor 140b as provided above. However, this process tends to be monetarily costly because of the resources needed to alter labeling and further recertify the product. Moreover, requiring recertification adds additional delay when shipping the surplus product to an end user, such as the end user 140a.

To address the above deficiencies, the products produced from the factory/manufacturer 104a/104b/104c may be configured with electronic label(s) capable of updating information displayed by the label. In such examples, the electronic label(s) (e-labels) may be affixed to the exterior of the product housing, or integrated in the product housing, and may be preconfigured with default text for display. Accordingly, as neither the physical affixed e-label nor the information conveyed by the e-label changes, the product may be associated with a single universal SKU at the ISO 13485 facility. That is, the information conveyed, such as the intended content and/or meaning, does not change; rather the translated artwork conveying the content changes. Based on configuration settings programed into the e-label, the default text may then be translated into an appropriate language based on the destination country. In this way, the information conveyed by the affixed e-label need not be altered for different destination countries, but rather the language in which the information is displayed changes. Thus, once the product has been certified at the certification facility 112, the product can be shipped to nearly any destination without requiring recertification. Moreover, rather than requiring a SKU be assigned for each country, or region, to which the product may be shipped, a single universal SKU may be assigned to the product. That is, since the external configuration of the product does not change, a single SKU identifier may be representative of all like products without regard to the location in which the product is to be shipped or where the end user 140a is located. Accordingly, settings for language and/or units depicted by one or more e-label(s) on the exterior of the product may be configured at any time, such as at the certification facility 112, at the flow/distribution center 116a/116b, at the shipping facility 120, at the destination receiver facility 128a/128b, at the destination distribution facility 136a/136b/136c, at the vendor 140b, and/or at the end user 140a. In some examples, language settings for the electronic labels may be configured while the product is stored at a distribution center, while the product is in transit, and/or when the product is received. In some instances, the product configuration may be performed without removing the product from a box or other shipping container.

Figure 2:
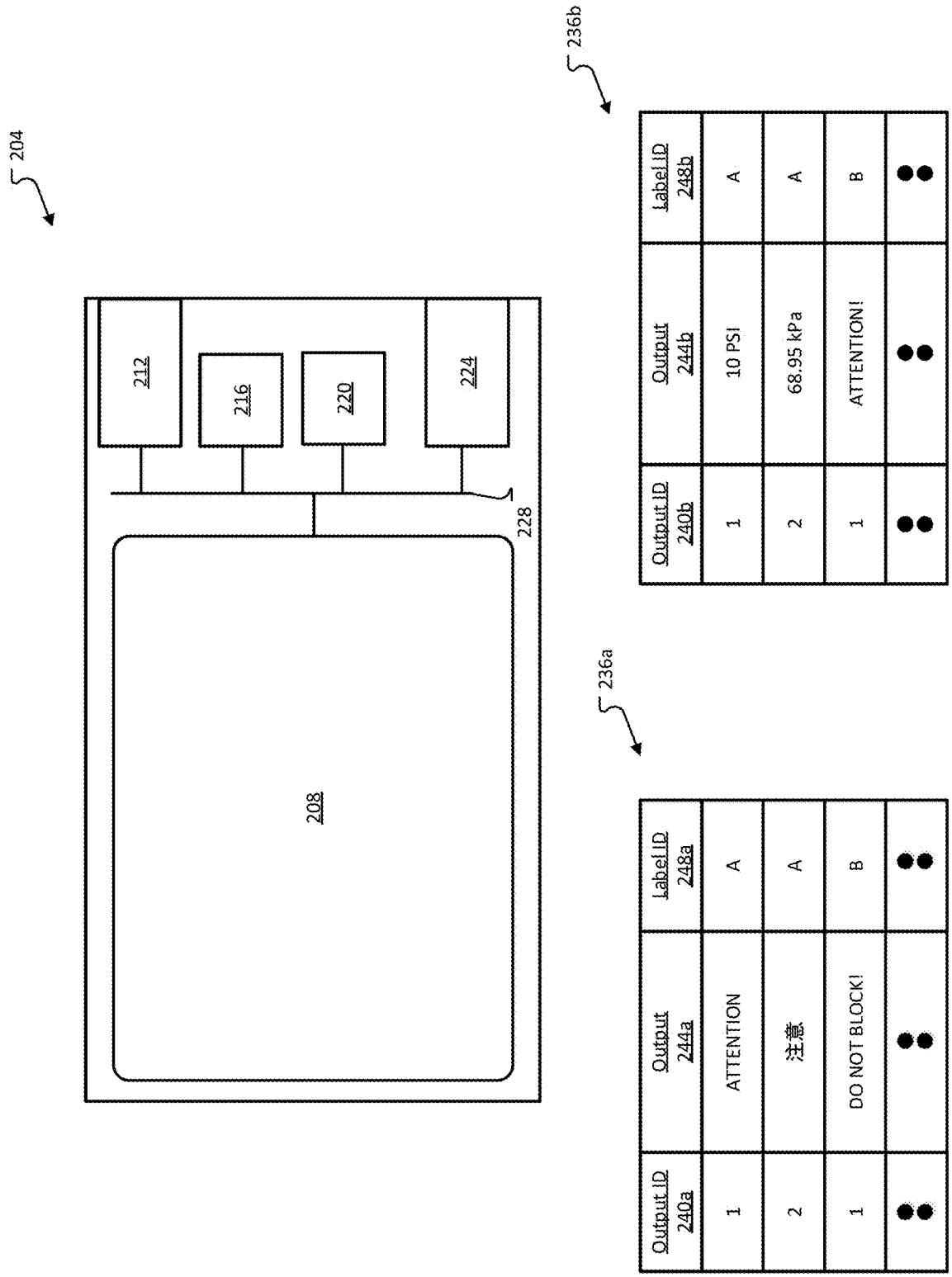
FIG. 2 illustrates an example block diagram of an electronic label used in one or more products manufactured by the manufacturer.

FIG. 2 is a block diagram illustrating an electronic label in accordance with examples described herein. The electronic label 204 may include a display 208, optional power supply/power interface 212, processor 216, storage 220, and a communication interface 224 communicatively coupled to one another via the bus 228. The display 208 may include at least one of a liquid crystal display (LCD), a thin film transistor-LCD (TFT LCD), an organic light-emitting diode (OLED), a flexible display, a three-dimensional (3D) display, any type of bistable display, and an e-ink display. In addition, the display 208 may maintain the current state of the displayed information when power is removed. As one example, an electronic ink display is capable of maintaining a current state of displayed information in the absence of power. Electronic ink, also known as e-paper, electronic paper, and/or e-ink, may include an electrophoretic display that forms images by rearranging charged pigment particles with an applied electric field. Other types and variations of e-ink may also be utilized. While power may be provided on a periodic basis to refresh the display, electronic ink is capable of maintaining a state of displayed information for long periods of time while drawing little, if any, power. Moreover, e-ink may be printed on most any surface; thus, the electronic label 204 may be adhered to a product using an adhesive or otherwise directly printed onto a surface of the product. Alternatively, or in addition, the electronic label 204 may be integrated into a product such that the display 208 is integrated into a side panel or other area of a product.

The electronic label 204 may include at least one processor 216 and a memory 220. Depending on the configuration and type of electronic label 204, the memory 220 may comprise, but is not limited to, volatile storage (e.g., random access memory), non-volatile storage (e.g., read-only memory), flash memory, or any combination of such memories. The memory 220 may include an operating system, one or more program modules, and/or other processor executable instructions suitable for performing the various aspects disclosed herein. Alternatively, or in addition, the processor 216 may include an operating system, one or more program modules, and/or other executable instructions suitable for performing the various aspects disclosed herein. Alternatively, or in addition, the processor 216 may refer to one or more discrete components configured to output information to the display 208. Accordingly, the memory 220 may contain the information that is read by or otherwise directed by the processor 216 to be output to the display 208.

The power supply/power interface 212 of the electronic label 204 may be configured to be a rechargeable power source, a non-rechargeable power source, be configured to accept wireless transferred power, and/or be directly connected to or otherwise coupled to another power source, such as a power source of the product to which the electronic label 204 is attached. In examples, the power source/power interface 212 may be implemented as a battery, capacitor, or other device capable of storing a charge. Moreover, the power supply/power interface 212 may receive power wireless from one or more external objects. For example, the power supply/power interface 212 may include an inductive circuit configured to receive a time-varying electromagnetic field and supply the extracted power from the time-varying electromagnetic field as an electrical load. In some instances, the power supply/power interface 212 of the electronic label 204 may be positioned about the product to which it is attached such that wireless power is transmitted through one or more side portions of the product.

The communication interface 224 may include any type of wired or wireless links capable of receiving and/or communicating encrypted and/or non-encrypted information. Transmission media used as links, for example, can be any suitable carrier for electrical signals, such as copper wire, and fiber optics, and may take the form of acoustic or light waves, such as those generated during radio-wave and infra-output. In some examples, the communication interface 224 may include utilize a radio-frequency identification RFID circuit to passively collect energy from and/or otherwise be activated by an external RFID device. For example, the communication interface 224 may be inactive until a specific signal, or indication, is received at the communication interface 220. Once received, the communication interface 224 may become active and may send a signal or otherwise cause the processor 216 and memory 220 to become active such that the processor 216 may write, or otherwise, update the display 208. That is, the communication interface 224 may receive configuration information indicating what information should be displayed at the display 208.

As further provided in FIG. 2, the memory 220 may store or otherwise have access to configuration information 236a/236b. The configuration information 236a/236b may be predefined information such that only the data contained in the configuration information 236a/236b may be presented to the display 208. In examples, the configuration information 236a may include an Output ID 240a identifying a specific Output 244a to be provided to the display 208. In some examples, the configuration information 236a may additionally include a Label ID 248a such that when an Output ID 240a and a Label ID 248a is received at the communication interface 244, the processor 216 may retrieve, and/or the memory 220 may provide, the Output 244a associated with the Label ID 248a and the Output ID 240a. In examples, the configuration information 236a may include an output "ATTENTION." In some instances, all entries in the configuration information 236a may be associated with the word "ATTENTION." That is, all entries in the configuration information 236a may be a translation of the word "ATTENTION" in one or more languages. For example, the electronic label 204 may receive configuration information indicating that an output associated with an output ID 240a corresponding to "2" is to be provided to the display 208. Accordingly, 注意 (Japanese for "attention") may be provided to the display 208.

In examples where a Label ID 248a is utilized to determine what should be displayed at the display 208, the electronic label 204 may receive configuration information indicating that an output associated with an Output ID 240a corresponding to "1" is to be provided to the display 208, where the electronic label 204 is associated with a location B. Accordingly, the text "DO NOT BLOCK!" may be provided to the processor 216 or otherwise the display 208. Once the text has been provided to the display 208, the electronic label 204 may remove power to the display 208 in order to conserve power.

Configuration information 236b further depicts that data within the configuration information 236b may correspond to measurement unit conversions. For example, some countries rely on the imperial system while other countries rely on the metric system. Thus, when configuring a text to display, such as Output 244a, units associated with numerical values may need to be converted. For example, 10 PSI may be converted to 68.95 kPa. Thus, similar to the text discussed with respect to the configuration information 236a, the configuration information 236b may include an Output ID 240b identifying a specific Output 244b to be provided to the display 208. That is, the electronic label 204 may receive configuration information indicating that an output associated with an output ID 240b corresponding to "2" is to be provided to the display 208. Accordingly, "68.95 kPa" may be provided to the output display 208. Accordingly, each entry in the configuration information 236b may be related to one another; that is, each entry may mean the same thing, just using different units.

In examples where a Label ID 248b is utilized to determine what should be displayed at the display 208, the electronic label 204 may receive configuration information indicating that an output associated with an Output ID 240b corresponding to "1" is to be provided to the display 208, where the electronic label 204 is associated with a location B. Accordingly, the text "ATTENTION!" may be provided to the processor 216 or otherwise the display 208. Once the text has been provided to the display 208, the electronic label 204 may remove power to the display 208 in order to conserve power. Thus, in some instances, the configuration information 236b may include a mix of predefined information, where the information associated with a particular location, or Label ID 248b, may have the same meaning. In some examples, the configuration information 236a/236b residing at memory of the electronic label 204 to be changed. That is, if content of an electronic label were to be revised at some point in the product life-cycle, a configuration tool or other system update could provide the updated content for the electronic label to display.

In some examples, the configuration information 236a/236b residing at the memory 220 of the electronic label 204 may be changed. That is, if at some point in a product's life-cycle the content of an electronic label were to be revised, a configuration tool or other system update could provide the updated content for the electronic label to display. Accordingly, output 244a/244b may be updated to reflect different information, or content, that is to be displayed to the user. For example, the text "ATTENTION", may be updated to read, "CAREFUL." Accordingly, the electronic label 204 may receive an update indicating that the contents of output 240a corresponding to Output ID 240a of the configuration information 236a should be replaced with "CAREFUL." In some examples, all output 244a is replaced; thus the contents of output 244a associated with "2" of Output ID 240a may correspond to a Japanese translation of "CAREFUL."

Figure 3:
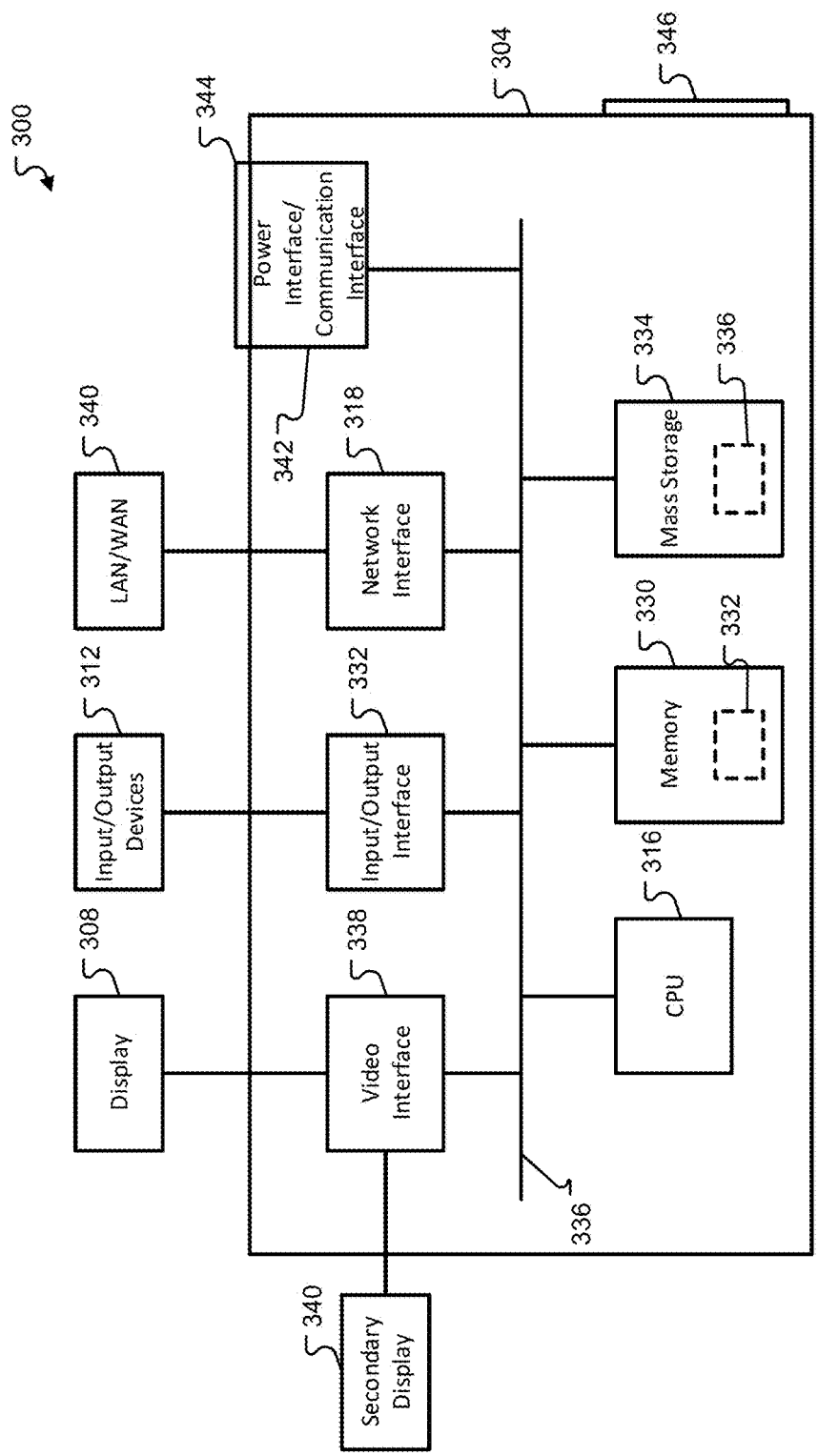
FIG. 3 illustrates an example block diagram of a device including an electronic label manufactured by the manufacturer.

FIG. 3 is a block diagram illustrating an example of a processing system 300 in accordance with examples disclosed herein. The processing system 300 depicted may be a portion of the product produced by the manufacturer 104a/104b/104c. The processing system 300 may include a processing unit 304, such as a desktop computer, a workstation, a laptop computer, a dedicated unit customized for a particular application, a smart phone or tablet, etc. The processing system 300 may be equipped with a display 308 and one or more input/output devices 312, such as a mouse, a keyboard, touchscreen, printer, etc. The processing unit 304 may also include a central processing unit (CPU) 316, memory 320, a mass storage device 324, a video adapter 328, and an I/O interface 332 connected to a bus 336.

The bus 336 may be one or more of any type of several bus architectures including a memory bus or memory controller, a peripheral bus, or video bus. The CPU 316 may comprise any type of electronic data processor, and the memory 320 may comprise any type of system memory, such as static random access memory (SRAM), dynamic random access memory (DRAM), or read-only memory (ROM).

The mass storage device 324 may comprise any type of storage device configured to store data, programs, and other information and to make the data, programs, and other information accessible via the bus 336. The mass storage device 324 may comprise, for example, one or more of a hard disk drive, a solid state drive, a magnetic disk drive, an optical disk drive, other non-volatile memory, or the like.

The term computer-readable media as used herein may include computer storage media such as the system memory and storage devices mentioned above. Computer storage media may include volatile and nonvolatile, removable and non-removable media implemented in any method or technology for storage of information, such as computer readable instructions, data structures, or program modules. The memory 320 and mass storage device 324 are computer storage media examples (e.g., memory storage). Thus, computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 300. Any such computer storage media may be part of the processing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The video adapter 328 and the I/O interface 332 provide interfaces to couple external input and output devices to the processing unit 304. As illustrated in FIG. 3, examples of input and output devices include the display 308 coupled to the video adapter 328 and I/O devices 312, such as a mouse, keyboard, printer, and the like, coupled to the I/O interface 332. Other devices may be coupled to the processing unit 304, and additional or fewer interface cards may be utilized. For example, a serial interface card (not shown) may be used to provide a serial interface for a printer. The processing unit 304 may also include a network interface 334 that may be a wired link to a local area network (LAN) or a wide area network (WAN) and/or a wireless link.

Examples of the processing system 300 may include other components. For example, the processing system 300 may include power supplies, cables, a motherboard, removable storage media, cases, and the like. These other components, although not shown, are considered part of the processing system 300.

In some examples, software code is executed by the CPU 316 to perform a function associated with the product. The software code may be accessed by the CPU 316 via the bus 336 from the memory 320, mass storage device 324, or the like, or remotely through the network interface 318. As one non-limiting example, software code 322/326 may reside within one or more of the memory 320 or mass storage 324 for performing a function associated with the product and/or directing the CPU 316 to output information to the display 308 and/or a secondary display 348.

In accordance with examples provided herein, the processing unit 304 may be coupled to a secondary display 348. The secondary display 348 may include a display similar to the electronic label 204 in accordance with the examples as previously discussed. In some examples, the processing unit 304 may send diagnostic information to the secondary display 348; the diagnostic information may include error faults, error codes, and/or other information pertinent to the operation of the processing unit 304 and/or the processing system 300 but not displayed on the main display 308. For example, if power provided to the processing unit 304 is unexpectedly absent, the processing unit 304 and/or the processing system 300 may cause one or more error codes and/or fault codes to be displayed at the secondary display 348. Since the secondary display 348 includes a display capable of maintaining a current state of displayed information in the absence of power, a technician, or otherwise, would have access to the error codes and/or fault codes indicative of a problem impacting the processing unit 304 and/or the processing system 300.

FIG. 3 further depicts an example of the power interface/communication interface 342; the power interface/communication interface 342 may be provided as part of the processing system 300 and/or the product and may be configured to communicate information and/or power to an electronic label 344. FIG. 3 also depicts an electronic label 346 positioned about the product and/or processing system 300. The electronic labels 344 and 346 may be the same as or similar to the electronic label 204 previously described. In accordance with examples, the processing system 300 and/or processing unit 304 may configure the electronic labels 344 and 346 upon an initial configuration or setup procedure. Accordingly, the processing system 300 and/or processing system 304 may communicate with the electronic labels 344 and/or 346 and select which of the predefined data within the configuration information 236a/236b should be displayed. In some instances, an electronic label 344 may communicate directly with another electronic label 346 for example; thus by configuring one electronic label 344 for example, other electronic labels, such as electronic label 346, in proximity to the configured electronic label 344 may be configured with the desired text and/or setting.

Figure 4:
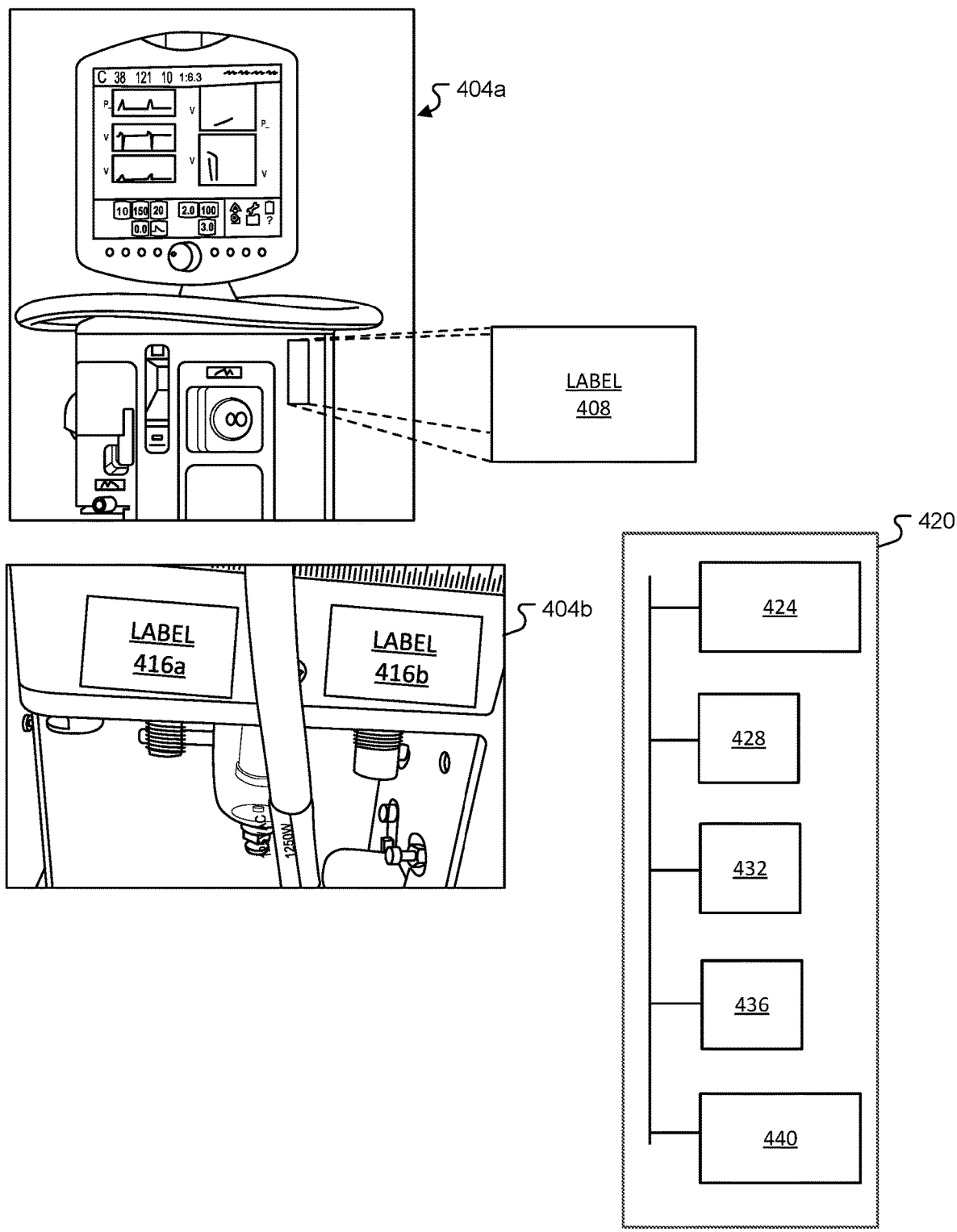
FIG. 4 illustrates a block diagram of another example of a device including an electronic label manufactured by the manufacturer and further depicts a configuration device utilized to provide information to the electronic label.

FIG. 4 depicts additional details of portions 404a/404b of a product incorporating an electric label 408 and 416a/416b. That is, a product may correspond to a medical device, such as a ventilator and may include various labels affixed and/or incorporated into the medical device as previously discussed. The label 408 may be incorporated into a portion of the product as depicted in 404a while labels 416a and 416b may be affixed to various portions of the product, as depicted in 404b. Electronic labels 408 and 416a/416b may be the same as or similar to the electronic label 204 previously described.

FIG. 4 further depicts a configuration device 420 for wirelessly configuring one or more electronic labels 408, 404a/404b, 204, 344, and/or 346 for example. That is, the configuration device 420 may be configured to wirelessly communicate with one or more electric labels utilizing the communication interface 424. Accordingly, the communication interface 424 may communicate a selection as received from a user input 428; the user input 428 may correspond to a specific language, location, and/or output identifier, for example Output ID 240a. Accordingly, the user input may be received at a user input device 428, and may be stored in a memory 432. A processor 436 may communicate with the memory 432 to retrieve the stored configuration received from the user input device 428, and cause the communication interface 424 to communicate the stored configuration to one or more labels, such as label 408 for example. The communication device 420 may further include a power supply 440 for powering the communication device 420 and/or for providing power to an electronic label 408 for example such that the electronic label 408 may be passively activated. In some examples, the configuration device 420 may cause one or more of the predefined data within the configuration information 236a/236b residing at memory of the electronic label 204 to be changed. For example, the configuration device 420 may send a portion of the configuration information 236a/236b to the electronic label 20, such that data within the configuration information 236a/236b at the memory associated with the electronic label 204 is changed.

Figure 5:
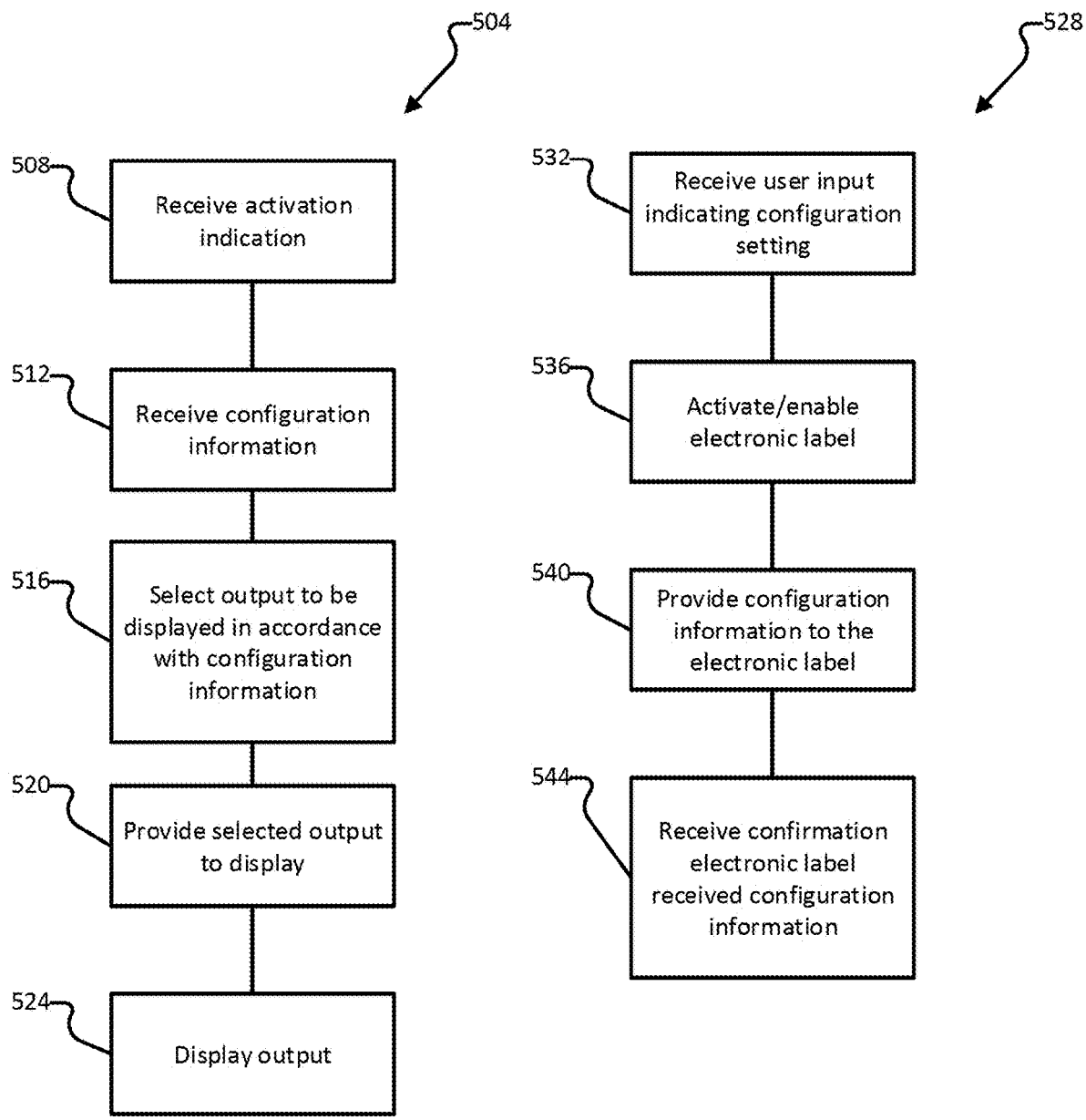
FIG. 5 provides flow diagrams for methods directed to configuring an electronic label.

FIG. 5 depicts details of methods 504 and 528 for configuring an electronic label, such as electronic label 204, in accordance with aspects of the present disclosure. In some aspects, FIG. 5 depicts a radio frequency (RF) based update scheme, where one or more electronic labels within a specific radio frequency range of an RFID device, or other device capable of wirelessly transmitting configuration information such as the configuration device 420, may be configured. A general order for the steps of the methods 504 and 528 is shown in FIG. 5. The methods 504 and 528 can include more or fewer steps or the steps can be arranged in an order different from those shown in FIG. 5. The methods 504 and 528 can be executed as a set of computer-executable instructions executed by a computer system and encoded or stored on a computer readable medium. Further, the methods 504 and 528 can be performed by gates or circuits associated with a processor, Application Specific Integrated Circuit (ASIC), a field programmable gate array (FPGA), a system on chip (SOC), or other hardware device. Hereinafter, the methods 504 and 528 shall be explained with reference to the systems, components, modules, software, data structures, user interfaces, etc. described in conjunction with FIGS. 1-4.

At operation 508, an activation indication may be received at an electronic label, such as electronic label 204. That is, a communication interface, such as the communication interface 212, may receive an indication that a configuration device, such as the configuration device 420, is attempting to transmit information. Thus, the electronic label 204 may move into an activated state such that the electronic label 204 is configured to receive configuration information. In some instances, the activation indication received at operation 508 may correspond to the configuration data itself. For example, the activation indication may correspond to the configuration information 236a/236b. Alternatively, or in addition, the activation indication at operation 508 may be consistent with receiving an indication that an RFID device, or other device capable of wirelessly transmitting configuration information, is in proximity to the communication interface 212. In some examples, the activation indication may include device identification information, such as a serial number or other identifying information, to ensure that one or more electronic labels associated with a specific device(s) and/or desired device(s) are configured, rather than other electronic labels that may also be in the accessible area of an RF-based update scheme.

At operation 512, the configuration information may be received by the electronic label 204 for example. In some instances, the electronic label 204 may provide an indication to the configuration device that is wirelessly communicating with the electronic label 204 that the electronic label 204 received the configuration information. The configuration information may correspond to a regional configuration of the electronic label 204 and may be driven via geolocation data provided by an electronic label system, a device on which the electronic label is installed, network-provided data, and/or a dedicated configuration tool, such as an RFID device, or other device capable of wirelessly transmitting configuration information to the communication interface 212, for example the configuration device 420.

At operation 516, the electronic label 204 may select an output to be displayed according to the received configuration information. As previously discussed, the configuration information that may be stored at the electronic label 204, for example in memory 220, may be preconfigured and/or predefined. Thus, in accordance with examples described herein, the configuration information received at operation 512 may correspond to an output ID, such as Output ID 240a. Accordingly, the associated output, such as Output 244a may be selected. In some examples, a regional configuration identifier may be utilized to select or otherwise determine an output to be displayed.

At operation 520, the selected output may be provided to the display, such as display 208. In examples, the processor 216 may cause the selected output to be displayed at the display 208. Accordingly, at operation 524, the display, such as display 208, may cause the selected output to be displayed.

At operation 532, user input indicating a selected configuration setting may be received at the user input 428 for example. For example, a user may provide a selection indicating that a specified language or specified units is to be displayed at a label 208 of an electronic label 204. As another example, the user input may correspond to a confirmation of a specific regional configuration provided on the basis of geolocation data provided by an e-label system, the device on which the electronic label is installed, network-provided data, and/or a dedicated configuration tool, such as an RFID device, or other device capable of wirelessly transmitting configuration information to the communication interface 212, for example the configuration device 420. At operation 536, an activation signal may be provided from the communication interface 424 to the communication interface 212; the activation signal may cause the electronic label 204 to become active. Alternatively or in addition, at operation 540, the user input received at the user input 428 may be provided to the electronic label, such as electronic label 204. The communication interface, such as the communication interface 424, may provide the selected configuration setting to a communication interface 212 of the electronic label 204. In so doing, the electronic label 204 may be caused to become active. At operation 544, the electronic label 204 may provide a confirmation communication back to the configuration device 420 for example, indication to a user that the label 204 has received the selected configuration information.

Figure 6:
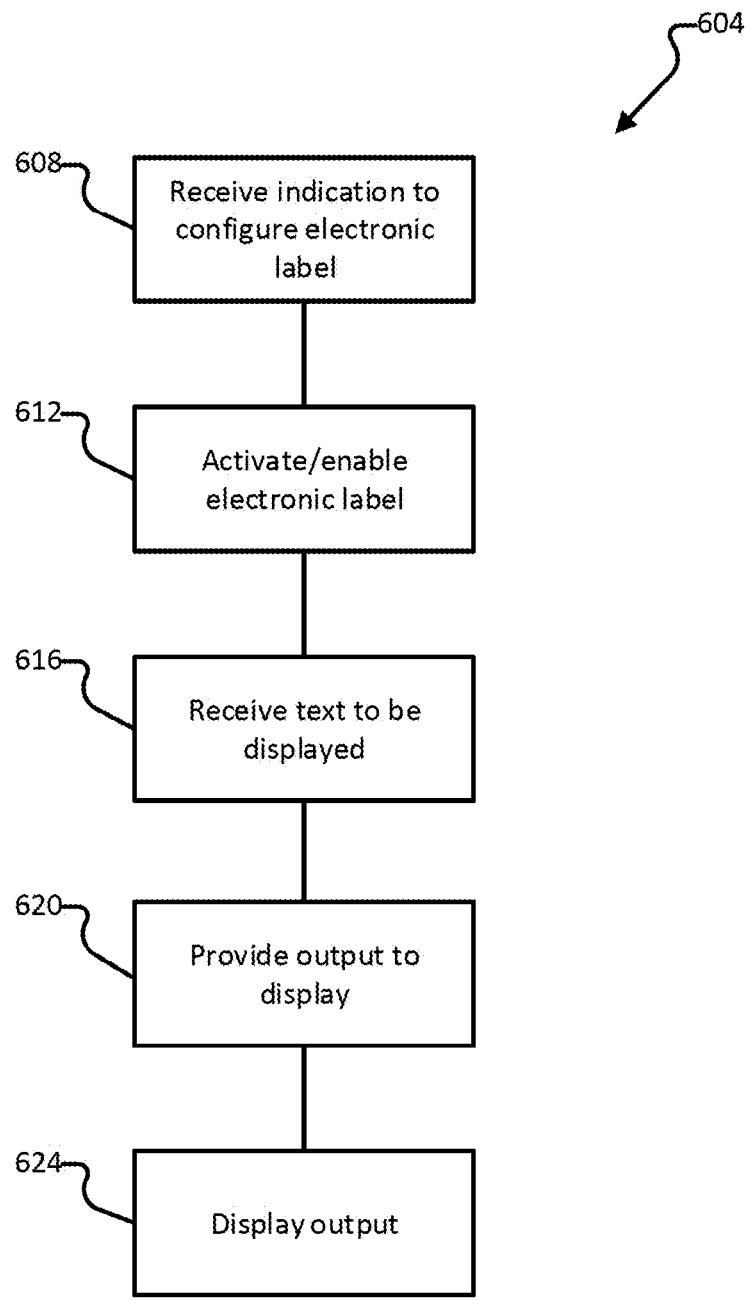
FIG. 6 provides a flow diagram for an alternate method directed to configuring an electronic label.

FIG. 6 depicts details of a method 604 for configuring an electronic label, such as electronic label 204, in accordance with aspects of the present disclosure. A general order for the steps of the method 604 are shown in FIG. 6. The method 604 can include more or fewer steps or the steps can be arranged in an order different from those shown in FIG. 6. The method 604 can be executed as a set of computer-executable instructions executed by a computer system and encoded or stored on a computer readable medium. Further, the method 604 can be performed by gates or circuits associated with a processor, Application Specific Integrated Circuit (ASIC), a field programmable gate array (FPGA), a system on chip (SOC), or other hardware device. Hereinafter, the method 604 shall be explained with reference to the systems, components, modules, software, data structures, user interfaces, etc. described in conjunction with FIGS. 1-5.

In general, method 604 differs from method 504 in that rather than providing a selection indication for configuration information to be selected and then displayed at a display 208 of an electronic label 204, the information to be displayed, or text, may be provided directly from the configuration device 420 to the electronic label 208. That is, text may be provided from the configuration device 420 directly to the electronic label 204. Thus, at operation 608, an indication that a device is to configure an electronic label 204 is received at the communication interface 212 of the electronic label 204. At operation 612, the received indication that the device is to configure the electronic label 204 may cause the electronic label 204 to move into an activated state such that the electronic label 204 is configured to receive text. In some instances, the activation indication received at operation 608 may correspond to the text itself. For example, the activation indication may correspond to the text to be displayed. Alternatively, or in addition, the activation indication at operation 612 may be consistent with receiving an indication that an RFID device, or other device capable of wireless transmitting configuration information, is in proximity to the communication interface 212.

At operation 616, the text is received at the electronic label 204 for example. In some instances, the electronic label 204 may provide an indication to the configuration device that is wirelessly communicating with the electronic label 204 that the electronic label 204 received the text information.

At operation 620, the electronic label 204 may cause the received text to be displayed at the display 208. In examples, the processor 216 may cause the text to be displayed at the display 208. Accordingly, at operation 624, the display, such as display 208, may cause the selected output to be displayed.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for configuring an electronic label, the method comprising:
receiving, at a communication interface of an electronic label coupled to a medical device, configuration information associated with a regulation of the medical device, wherein the configuration information corresponds with a plurality of outputs stored in a memory of the electronic label;

receiving, at the communication interface of the electronic label, a selection of an output of the plurality of outputs; and causing display of the selected output at a display of the electronic label.

2. The method of claim 1, wherein each output of the plurality of outputs includes a translation of at least one of:
a same word in a different language;
a combination of words in a different language;
one or more numbers in a different language; and
one or more symbols in a different language.

3. The method of claim 1, wherein the selected output corresponds to one of:
a country of origin of the medical device; and
a destination country of the medical device.

4. The method of claim 1, wherein the received selection includes location information corresponding to a geographic location of the electronic label; and
based on the received location information, automatically selecting the selected output from the plurality of outputs.

5. The method of claim 1, further comprising:
maintaining a durable image of the selected output after removing power supplied to the display of the electronic label.

6. The method of claim 1, wherein the selected output is a first output, and wherein the method further comprises:
receiving, at the communication interface of the electronic label, a second selection of a second selected output of the plurality of outputs stored in the memory of the electronic label; and
causing display of the second output at the display of the electronic label.

7. The method of claim 6, wherein the second output is in a language different than the first output.

8. The method of claim 1, wherein the configuration information is received wirelessly at the communication interface associated with the electronic label.

9. A method for configuring a plurality of medical devices for compliance with one or more medical device certification standards, the method comprising:
receiving the plurality of medical devices configured according to a medical device regulation certification process, wherein the plurality of medical devices includes a first set of medical devices and a second set of medical devices;
receiving a certification, in accordance with the medical device regulation certification process, for each of the plurality of medical devices;
configuring a first electronic label coupled to each of the first set of medical devices in a first configuration for the certification, wherein the first configuration is associated with a first destination;
configuring a second electronic label coupled to each of the second set of medical devices in a second configuration for the certification, wherein the second configuration is associated with a second destination;
assigning the second set of medical devices to the first destination; and
based on assigning the second set of medical devices to the first destination, reconfiguring the second electronic label for each of the second set of medical devices to match the first configuration while remaining in compliance with the medical device regulation certification process and without receiving recertification of the second set of medical devices.

10. The method of claim 9, wherein configuring the first electronic label coupled to each of the first set of medical devices includes:
for each device of the first set of medical devices:
receiving, at a communication interface of the first electronic label coupled to the device, the first configuration corresponding to a first plurality of outputs stored in a memory of the electronic label;
selecting a first output from the first plurality of outputs; and
causing display of the selected first output at the display of the electronic label.

11. The method of claim 10, wherein configuring the second electronic label coupled to each of the second set of medical devices includes:
for each device of the second set of medical devices:
receiving, at the communication interface of the second electronic label coupled to the device, the second configuration corresponding to a second plurality of outputs stored in a memory of the electronic label;
selecting a second output from the second plurality of outputs; and
causing display of the selected second output at the display of the electronic label.

12. The method of claim 11, wherein reconfiguring the second set of medical devices having the second configuration to match the first configuration includes:
for each device of the second set of medical devices:
receiving, at the communication interface, the first configuration;
selecting the first output from the first plurality of outputs; and
causing display of the selected first output at the display of the electronic label.

13. The method of claim 12, wherein the first plurality of outputs of the first configuration is associated with a first language and the second plurality of outputs of the second configuration setting is associated with a second language.

14. The method of claim 10, further comprising:
maintaining a durable image of the selected first output after removing power supplied to the display of the electronic label.

15. The method of claim 11, wherein the memory includes the first output corresponding to the first configuration and the second output corresponding to the second configuration.

16. A medical device comprising:
a housing;
components assembled inside the housing according to a medical device regulation; and
an electronic label coupled to the housing, comprising:
a display;
a communication interface; and
memory, wherein the electronic label is configured to:
receive, at the communication interface, configuration information associated with the medical device regulation, the configuration information corresponding to a plurality of outputs stored in the memory;
receive, at the communication interface, a selection of a selected output of the plurality of outputs; and
cause display of the selected output at the display.

17. The electronic label of claim 16, wherein the electronic label includes an adhesive at a side opposite to the display to couple the electronic label to the housing of the medical device.

18. The electronic label of claim 16, wherein the communication interface is configured to remain in an inactive state until an activation indication is received at the communication interface.

19. The electronic label of claim 16, wherein the electronic label is integrated into the medical device.

20. The electronic label of claim 19, wherein each output of the plurality of outputs corresponds to a translation of a same word in a different language.

* * * * *